United States Patent
Kitta et al.

(10) Patent No.: US 8,241,027 B2
(45) Date of Patent: Aug. 14, 2012

(54) INJECTION MOLDING MACHINE HAVING A GUIDE MEMBER

(75) Inventors: Hideaki Kitta, Numazu (JP); Motoyasu Ohue, Numazu (JP); Atsushi Takemoto, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 72 days.

(21) Appl. No.: 12/963,285

(22) Filed: Dec. 8, 2010

(65) Prior Publication Data

US 2011/0142982 A1    Jun. 16, 2011

(30) Foreign Application Priority Data

Dec. 11, 2009   (JP) ................................. 2009-281928

(51) Int. Cl.
    *B29C 45/80*        (2006.01)
(52) U.S. Cl. .......................... 425/145; 425/149; 425/150
(58) Field of Classification Search .................. 425/145, 425/149, 150
    See application file for complete search history.

(56) References Cited

U.S. PATENT DOCUMENTS

| | | | |
|---|---|---|---|
| 4,735,564 A * | 4/1988 | Sasaki et al. ................. | 425/145 |
| 4,828,473 A | 5/1989 | Otake | |
| 5,129,808 A | 7/1992 | Watanabe | |
| 5,513,970 A * | 5/1996 | Kimura et al. ................ | 425/139 |
| 6,447,282 B1 | 9/2002 | Miyauchi | |
| 7,955,068 B2 * | 6/2011 | Kitta et al. .................... | 425/145 |
| 2003/0111756 A1 | 6/2003 | Morita | |
| 2003/0219504 A1 | 11/2003 | Harish | |
| 2003/0224085 A1 | 12/2003 | Onuma et al. | |
| 2005/0127546 A1 | 6/2005 | Morita | |

FOREIGN PATENT DOCUMENTS

JP    2003-80559    3/2003

OTHER PUBLICATIONS

English Language Abstract of JP 2003-80559, published Mar. 19, 2003.
Machine English Language Translation of JP 2003-80559, published Mar. 19, 2003.
German Office Action issued in DE 10 2009 052 063.5 on Jan. 5, 2011.
English Language Translation of German Office Action issued in DE 10 2009 052 063.5 on Jan. 5, 2011.
Image File Wrapper of U.S. Appl. No. 12/611,218 as of Apr. 12, 2011.

* cited by examiner

*Primary Examiner* — Tim Heitbrink
(74) *Attorney, Agent, or Firm* — DLA Piper LLP (US)

(57) ABSTRACT

A screw is moved along an axis by a screw advancement-retraction mechanism. A screw rotation mechanism is supported for movement along the axis by a pair of supporting members, each includes a rail for use as a guide member. The supporting members are arranged individually along tie-bars for use as lateral members and extend parallel to the tie-bars. One longitudinal end portion of each supporting member is secured to a frame of an injection unit by a fixing portion including a fixing member. The other end portion of the supporting member is supported on each tie-bar by a movable portion including a sliding member. The sliding member is movable along an axis of the tie-bar. With this arrangement, deformation, if any, of the tie-bar is prevented from affecting the rail, so that the screw rotation mechanism and the screw can move steadily.

5 Claims, 6 Drawing Sheets

INJECTION MOLDING MACHINE HAVING A GUIDE MEMBER

CROSS-REFERENCE TO RELATED APPLICATIONS

This application is based upon and claims the benefit of priority from prior Japanese Patent Application No. 2009-281928, filed Dec. 11, 2009, the entire contents of which are incorporated herein by reference.

BACKGROUND OF THE INVENTION

1. Field of the Invention

The present invention relates to an injection molding machine in which a screw moves along guide members on a frame, and more particularly, to an injection molding machine configured so that a reactive force produced during material injection can be prevented from affecting the guide members and the screw can be moved smoothly.

2. Description of the Related Art

An injection molding machine comprises a cylinder and screw. As the screw advances in the cylinder, a material (e.g., molten resin) is injected from the cylinder into a die set. To this end, the injection molding machine comprises a screw advancement-retraction mechanism, which moves the screw longitudinally in the cylinder, and a screw rotation mechanism, which rotates the screw in the cylinder. The screw rotation mechanism introduces the material (e.g., resin pellets) into the cylinder and kneads and melts the introduced material.

An example of a conventional injection molding machine is disclosed in Jpn. Pat. Appln. KOKAI Publication No. 2003-80559 (Patent Document 1). This injection molding machine comprises a middle plate located behind a screw, a bearing attached to the middle plate and supporting the rear end portion of the screw, and a motor that rotates the screw. The middle plate is supported on a slide base (moving base) below it by linear guide means. The middle plate is moved longitudinally by a linear motion mechanism, such as a ball screw.

In the conventional injection molding machine described above, the rear end portion of the screw and the motor for rotating the screw are mounted on the middle plate. The middle plate moves longitudinally on the slide base. In this injection molding machine, the position where the motor and the rear end portion of the screw are mounted on the middle plate is at a great vertical distance from the position of the lower part of the middle plate supported on the slide base. When the middle plate is longitudinally moved by the linear motion mechanism, therefore, a longitudinal moment acts on it, thereby causing the middle plate to undergo longitudinal deflection. Thus, the movement of the screw may become unstable in some cases.

In order to solve this problem, an injection molding machine has been proposed that comprises a frame, a pair of lateral members (connection plates) located beside the frame, a screw advancement-retraction mechanism behind the frame, a screw rotation mechanism between the lateral members, and guide members (linear guides) mounted on the lateral members. In this injection molding machine, the guide members and screw rotation mechanism are not substantially separated in the vertical direction, so that the movement of the screw is steady.

If a reactive force produced when the material is injected into the die set acts on the frame through the screw, in the injection molding machine constructed in this manner, the lateral members may be elongated in some cases. Thereupon, the guide members on the lateral members are stressed and bent, or their parallelism is reduced. In such a case, the movement of the screw rotation mechanism becomes so unstable that the screw cannot reliably move along its axis.

BRIEF SUMMARY OF THE INVENTION

The object of the present invention is to provide an injection molding machine in which a screw can be reliably operated even if a frame is deformed by a reactive force produced during injection.

An injection molding machine according to the invention comprises a cylinder, a screw in the cylinder, a screw rotation mechanism configured to rotate the screw, a screw advancement-retraction mechanism, a frame supporting the cylinder, and a pair of supporting members each comprising a guide member. The screw rotation mechanism comprises an electric motor and a transmission unit which transmits rotation of the motor to the screw. The screw advancement-retraction mechanism moves the screw along its axis. The frame comprises a front wall fitted with the cylinder, a rear wall fitted with the screw advancement-retraction mechanism, and a pair of lateral members, left and right, located beside the screw rotation mechanism and connecting the front wall and the rear wall. The guide members are arranged along the lateral members of the frame and guide the screw rotation mechanism in moving along the axis of the screw. Further, the injection molding machine comprises a fixing portion, which secures one longitudinal end portion of each of the supporting members to the frame, and a movable portion, which supports the other end portion of the supporting member for movement relative to each of the lateral members along its axis.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An injection molding machine according to one embodiment of present invention will now be described with reference to FIGS. 1 to 6.

Figure 5:
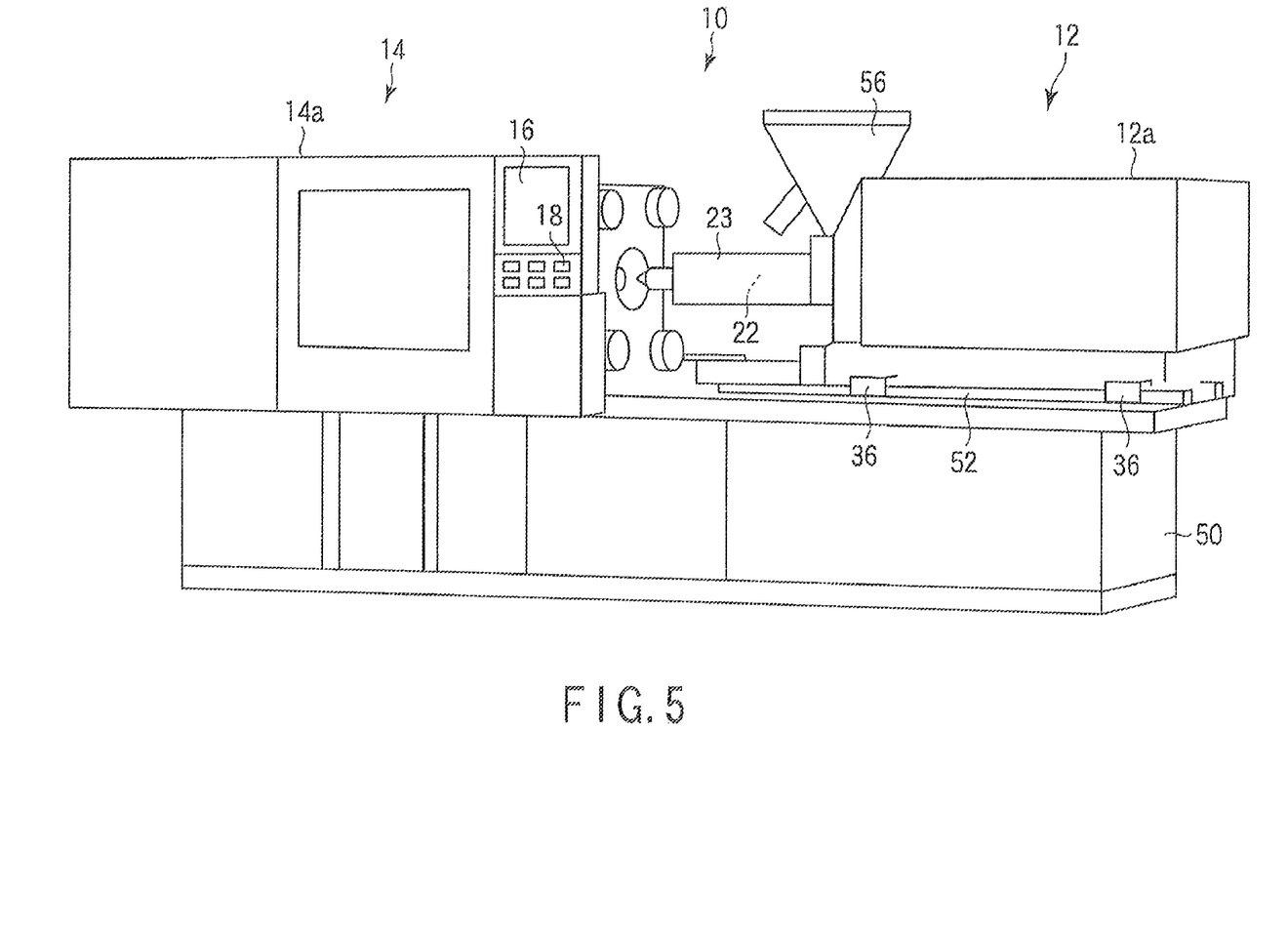
FIG. 5 is a perspective view showing an outline of the injection molding machine of FIG. 1.

FIG. 5 shows an outline of an injection molding machine 10. The injection molding machine 10 comprises a base 50, an injection unit 12 and die clamping device 14 arranged on the base 50, etc. Display means 16 and input means 18 are arranged in a substantially central portion of the machine 10.

The base 50 is substantially cuboid. A pair of first rails 52 are arranged on the upper surface of the base 50. The first rails 52 are located parallel to each other along the length of the base 50. The injection unit 12 is movably mounted on the rails 52. The die clamping device 14 is located on the left side, as viewed in FIG. 5, on the base. The device 14 is opposed to the unit 12.

The die clamping device 14 comprises a die clamping mechanism (not shown). The die clamping mechanism serves to open and close a die set (not shown) assembled to the device 14. The die clamping device 14, which has a conventionally known structure, comprises a pressure sensor, position sensor, etc., for detecting pressure during an open-close operation, open-close state, etc. While the die clamping device 14 is of the servomotor-operated type, for example, it may alternatively be of the hydraulically-operated type. As shown in FIG. 5, the injection unit 12 and die clamping device 14 are covered by covers 12a and 14a, respectively.

Figure 1:
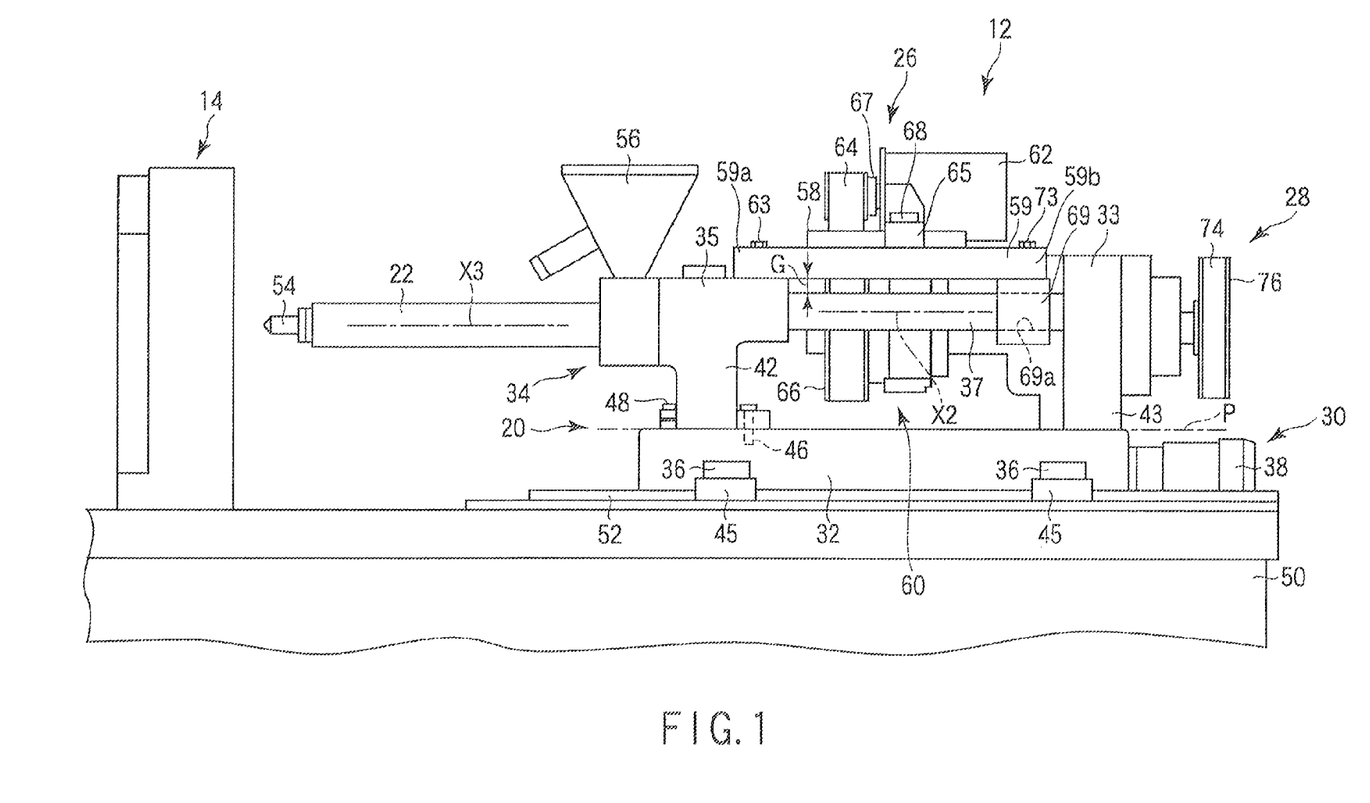
FIG. 1 is a partial side view of an injection molding machine according to one embodiment of the invention.
Figure 2:
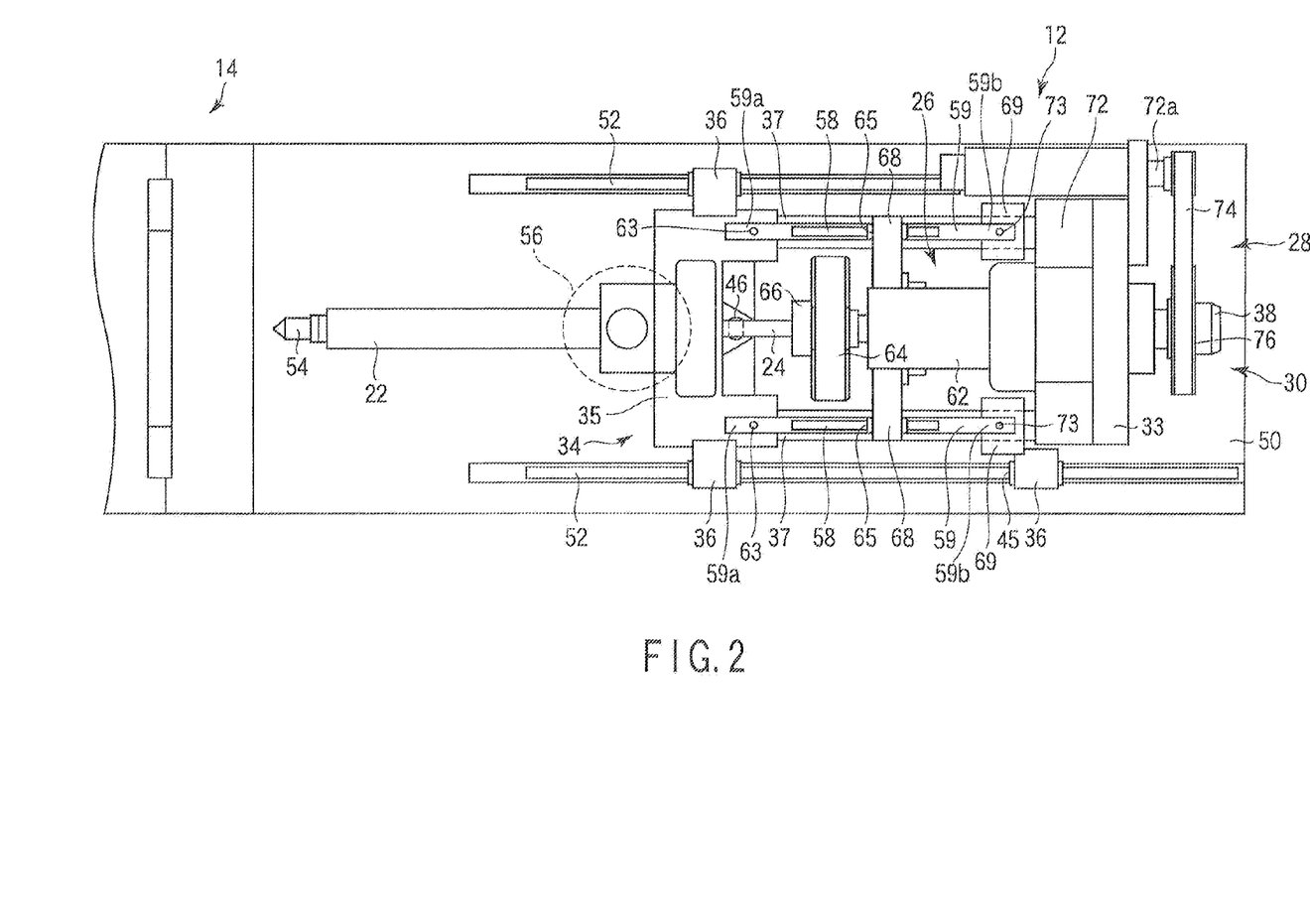
FIG. 2 is a partial plan view of the injection molding machine shown in FIG. 1.
Figure 3:
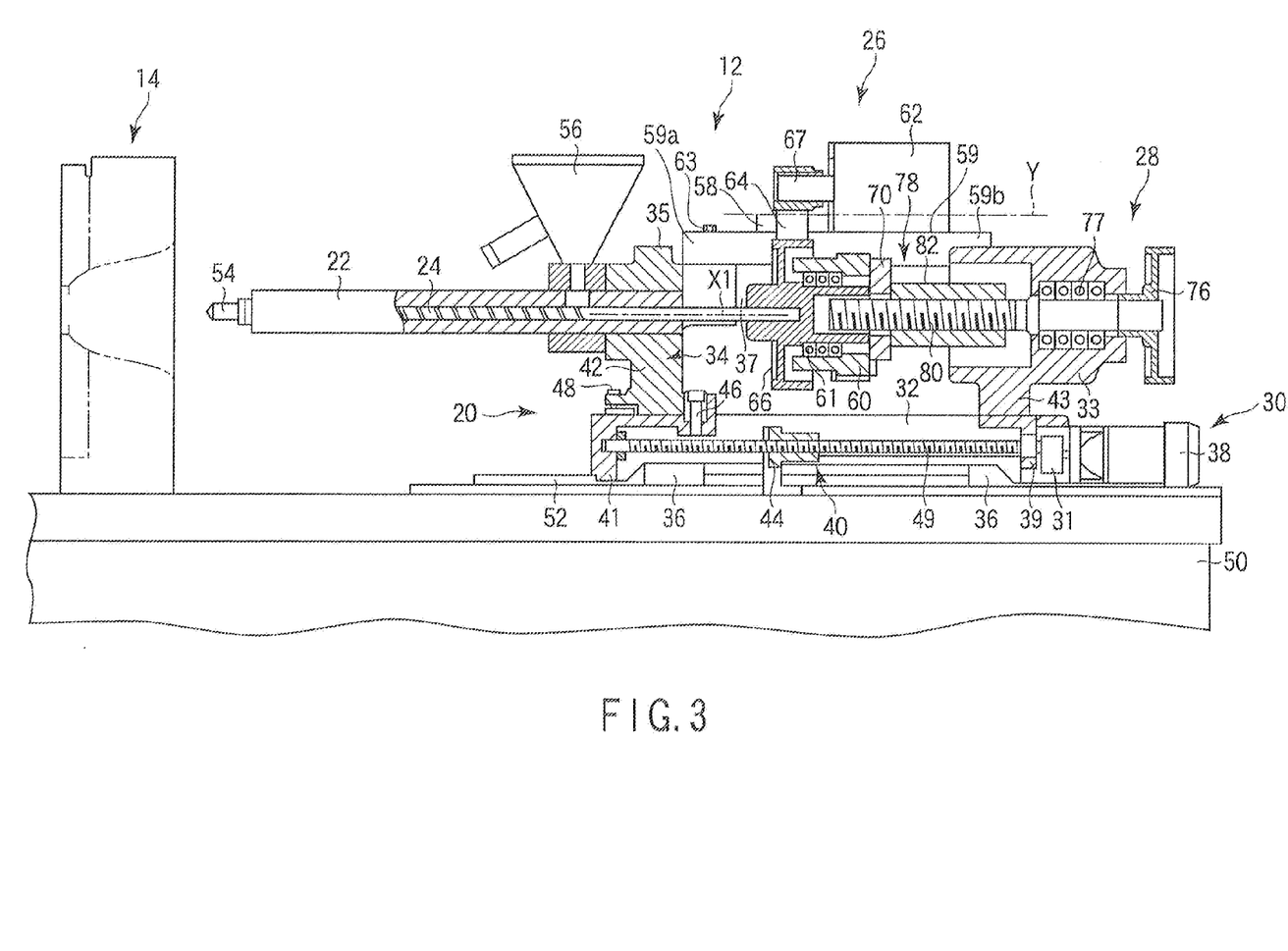
FIG. 3 is a partial sectional view of the injection molding machine shown in FIG. 1.

FIGS. 1 and 2 show the injection unit 12, and FIG. 3 is a sectional view of the unit 12. In the description to follow, the side of the injection unit 12 nearer to the die clamping device 14 is taken to be forward, and the front-rear and left-right directions are defined on the basis of it. Further, the direction of gravity is taken to be downward, and the opposite direction to be upward.

The injection unit 12 comprises a mainframe 20, cylinder 22, screw 24, screw rotation mechanism 26, screw advancement-retraction mechanism 28, propulsion mechanism 30, etc. The cylinder 22 is disposed in front (or on the left side in FIG. 1) of the mainframe 20. The screw 24 (partially shown in FIG. 2) is located in the cylinder 22. The screw rotation mechanism 26 rotates the screw 24 around axis X1 (FIG. 3). The screw advancement-retraction mechanism 28 advances and retracts the screw 24 along axis X1. The propulsion mechanism 30 advances and retracts the injection unit 12 on the first rails 52.

The mainframe 20 comprises a base 32 and frame 34 mounted on the base 32. The base 32 is flat, comprising support legs 36 on its left and right sides. The support legs 36 are movably mounted on the first rails 52 with the aid of slides 45. Thus, the base 32 is slidably supported on the base 50.

As shown in FIG. 3, the propulsion mechanism 30 comprises a drive motor 38 and ball screw mechanism 40. The drive motor 38 is mounted on a wall 39 at the back (or on the right side in FIG. 3) of the base 32. A drive shaft of the motor 38 penetrates the wall 39. The drive shaft is connected to a threaded portion 49 of the ball screw mechanism 40 through a gear mechanism 31. The threaded portion 49 substantially penetrates the center of the base 32. The distal end of the threaded portion 49 is rotatably supported on a wall 41 in front of the base 32. The ball screw mechanism 40 comprises a nut portion 44, which is in threaded engagement with the threaded portion 49. Within the base 32, the nut portion 44 is secured to the upper surface of the base 50.

The frame 34 is substantially quadrangular. As shown in FIG. 2, the frame 34 comprises a rear wall 33, front wall 35, a pair of tie-bars 37 for use as lateral members on left and right sides, etc. A front leg 42 (FIG. 1) is provided below the front wall 35, and a rear leg 43 below the rear wall 33. The front leg 42 is secured to the base 32 by a support pin 46 and fixing screw 48. If the screw 48 is loosened, the rear leg 43 slides on the base 32, whereupon the frame 34 is allowed to be turned around the pin 46.

Each of the tie-bars 37 is a cylinder having a fixed diameter along its axis X2 (FIGS. 1 and 2). The tie-bars 37 extend horizontally parallel to the screw 24 as well as to each other. Each tie-bar 37 is not limited to a cylinder and may alternatively be a structure of another form, such as a prism or angle bar. The end portions of each tie-bar 37 do not always need to be attached individually to the front surface of the rear wall 33 and the rear surface of the front wall 35. For example, the tie-bars may be formed having an overall length that covers the longitudinal length of the frame 34 and secured to the respective lateral sides of the rear and front walls 33 and 35.

The cylinder 22 is attached to the front wall 35 so as to extend forward. A nozzle portion 54 that closely contacts a die (stationary die, not shown) is provided on the distal end of the cylinder 22. A hopper 56 (FIGS. 1 and 3) is provided on the basal part of the cylinder 22. The hopper 56 internally communicates with the cylinder 22. The hopper 56 feeds resin pellets, as an example of a material, into the cylinder 22. The cylinder 22 is surrounded by a heater 23 (FIG. 5).

Figure 6:
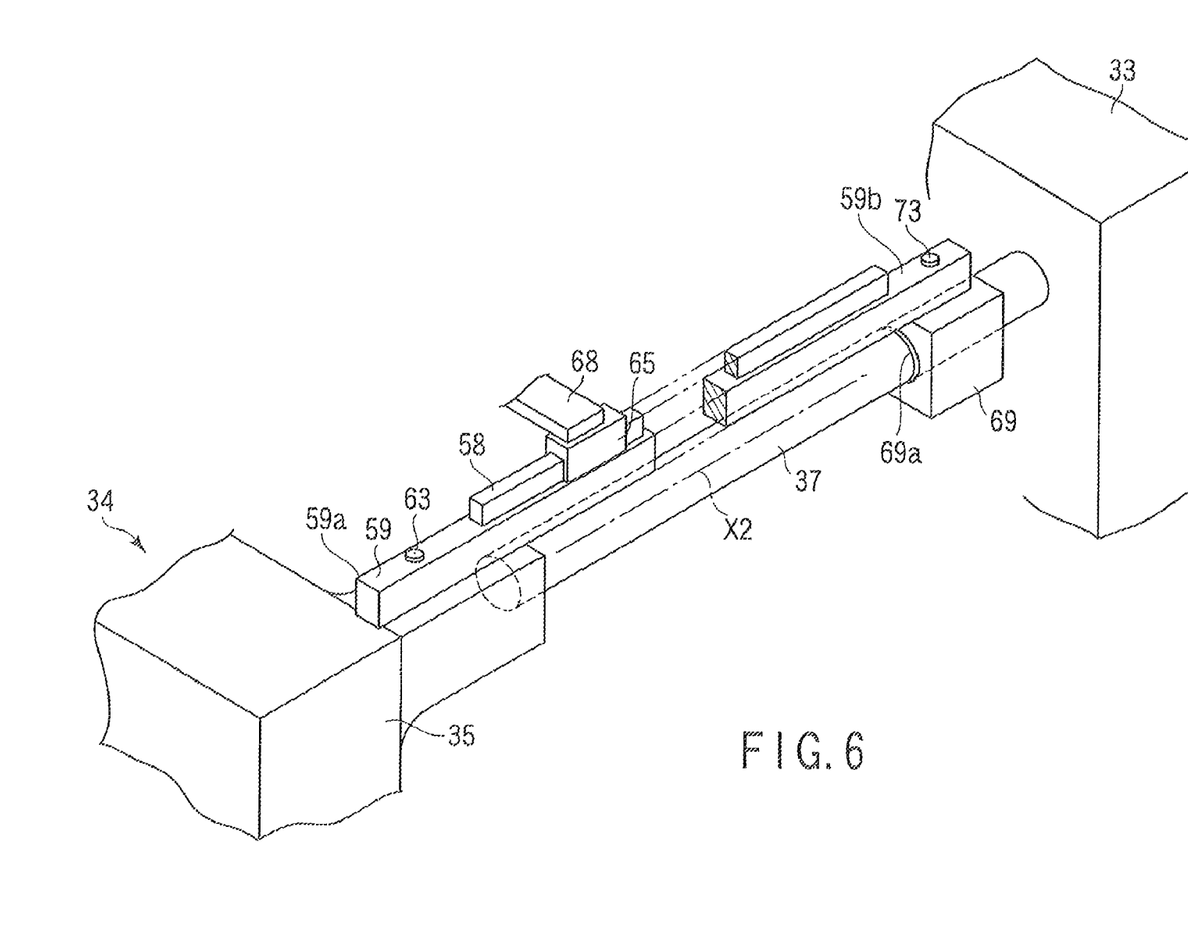
FIG. 6 is a perspective view showing a supporting member of the injection molding machine of FIG. 1 and its surroundings.

As shown in FIGS. 1 and 6, a supporting member 59 is located above each of the left and right tie-bars 37. A second rail (linear guide) 58 for use as a guide member is disposed above the supporting member 59. The supporting member 59 is provided on the upper surface of each tie-bar 37 so as to extend parallel to it.

The supporting member 59 is an elongated cuboid, one longitudinal end portion (front end) 59a of which is secured to the front wall 35 of the frame 34 by a fixing portion including a fixing member 63, such as a bolt. The supporting member 59 is located above its corresponding tie-bar 37 so as to extend parallel to it. A sliding member 69 comprising a bush 69a for use as a movable portion is secured to the other longitudinal end portion (rear end) 59b of the supporting member 59 by a fixing member 73, such as a bolt.

The sliding member 69 is provided on its corresponding tie-bar 37 without backlash so as to be slidable along axis X2 of the tie-bar 37. A gap G (FIG. 1) is defined between the lower surface of the longitudinal middle portion of the supporting member 59 and the upper surface of the tie-bar 37. The movable portion with the bush 69a is prevented from moving radially relative to the tie-bar 37 and allowed to move substantially along axis X2 only.

Each of the left and right second rails (linear guides) 58 is secured to the upper surface of each corresponding supporting member 59 by screws or the like. The second rails 58 extend parallel to each other and to axis X3 (FIG. 1) of the cylinder 22. A slide (carriage) 65 of the screw rotation mechanism 26 is movably mounted on the upper surface of each second rail 58. The second rails 58 and slides 65 constitute a linear guide system. The linear guide system may be replaced with an alternative guide mechanism.

The screw rotation mechanism 26 comprises a main body portion 60, electric motor 62, transmission belt 64, pulley 66, etc. The screw 24 is disposed within the cylinder 22 for reciprocation along axis X3 and rotation around axis X3. The proximal end portion of the screw 24 is connected to the pulley 66. The transmission belt 64 and pulley 66 constitute a transmission unit for transmitting rotation of the motor 62 to the screw 24.

The main body portion 60 of the screw rotation mechanism 26 comprises a pair of stays 68 extending left and right. The slides 65 are provided individually on the respective end portions of the stays 68. The slides 65 are slidably mounted on the second rails 58, individually. With this arrangement, the screw rotation mechanism 26 is movable relative to the frame 34 along axis X2 of each tie-bar 37.

The motor 62 is mounted on the top of the main body portion 60 of the screw rotation mechanism 26. The pulley 66 is rotatably disposed in front of the main body portion 60 with the aid of a bearing 61. The pulley 66 is connected to a rotating shaft 67 of the motor 62 by the transmission belt 64. The screw 24 is secured to the pulley 66 so that its axis X1 is in alignment with the center of rotation of the pulley 66.

The rotating shaft 67 of the motor 62 is located above-a plane (indicated by segment Y in FIG. 3) that contains the respective sliding surfaces of the left and right second rails 58. The screw 24 is located below plane Y. The screw advancement-retraction mechanism 28 is disposed behind the main body portion 60 of the screw rotation mechanism 26 with a load cell 70 between them.

The screw advancement-retraction mechanism 28 comprises a motor 72, transmission belt 74, pulley 76, ball screw mechanism 78, etc. The motor 72 is mounted beside the frame 34, and its rotating shaft 72a is connected to the pulley 76 by the transmission belt 74.

As shown in FIG. 3, the pulley 76 is rotatably supported on the rear wall 33 of the frame 34 by a bearing 77. A threaded portion 80 of the ball screw mechanism 78 is connected to the pulley 76. The threaded portion 80 is disposed on an extension of axis X1 of the screw 24. The threaded portion 80 threadedly engages with a nut portion 82 of the ball screw mechanism 78. The nut portion 82 is cylindrical and its front end face is secured to the rear surface of the load cell 70.

The load cell 70 is a pressure measuring device configured to measure pressure applied along axis X1 of the screw 24 and comprises a cylindrical strain-inducing element (not shown) and strain sensor (not shown) mounted thereon, etc. A hole with an inside diameter larger than the outside diameter of the threaded portion 80 is formed in the center of the load cell 70. The left- and right-side surfaces, as viewed in FIG. 3, of the load cell 70 are connected to the main body portion 60 of the screw rotation mechanism 26 and the nut portion 82, respectively. The output terminal (not shown) of the load cell 70 is connected to a controller (not shown). If pressure is applied to the load cell 70, an output signal corresponding to the pressure is delivered to the controller.

The following is a description of an operation of the injection molding machine 10.

The propulsion mechanism 30 is activated to start the drive motor 38. Thereupon, the threaded portion 49 rotates to move (or threadedly advance) relative to the nut portion 44, which is secured to the base 50. If the threaded portion 49 moves in a first direction, for example, the base 32 advances on the first rails 52. If the injection unit 12 advances as the base 32 thus advances, the nozzle portion 54 of the cylinder 22 contacts the die set. If the nozzle portion 54 closely contacts the die set at a predetermined pressure, the propulsion mechanism 30 stops, whereupon the injection unit 12 assumes a nozzle-touch state.

The hopper 56 contains a material, such as resin pellets. As the motor 62 of the screw rotation mechanism 26 is activated, the pulley 66 is rotated by the transmission belt 64. If the pulley 66 rotates, the screw 24 rotates in the cylinder 22. Further, the screw 24 is retracted in the cylinder 22 by the screw advancement-retraction mechanism 28.

The material (resin pellets) is introduced from the hopper 56 into the cylinder 22. The material is kneaded while being conveyed as the screw 24 rotates in the cylinder 22 that is heated by the heater 23. Thus, the material is melted and pooled in the distal end of the cylinder 22.

If a predetermined amount of material is pooled in the distal end of the cylinder 22 to be ready for injection, the motor 72 of the screw advancement-retraction mechanism 28 is activated. Then, the pulley 76 is rotated by the transmission belt 74, thereby causing the threaded portion 80 to rotate. Thereupon, the nut portion 82 in threaded engagement with the threaded portion 80 moves forward. The main body portion 60 of the screw rotation mechanism 26 is slidably supported on the second rails 58 by the stays 68. If the nut portion 82 moves forward, therefore, the pulley 66 is moved forward along the second rails 58 by the load cell 70. As the screw 24 advances in this manner, the material in the cylinder 22 is injected through the nozzle portion 54 into the die set that is clamped by the die clamping device 14.

In the present embodiment, plane Y (FIG. 3) that contains the respective sliding surfaces of the left and right second rails 58 is located between the screw 24 and the rotating shaft 67 of the motor 62. Specifically, the difference in level between the gravitational position of the screw rotation mechanism 26 and the sliding surfaces of the second rails 58 is small. When the screw rotation mechanism 26 moves forward along the second rails 58, therefore, it can smoothly slide along the second rails 58 without longitudinal deflection. Thus, the screw 24 connected to the screw rotation mechanism 26 can smoothly move along axis X1 in the cylinder 22.

If the material in the cylinder 22 is injected into the die set through the nozzle portion 54, its reactive force acts along axis X1 of the screw 24. This reactive force is transmitted from the rear end of the screw 24 to the pulley 66 and further to the main body portion 60 of the screw rotation mechanism 26 through the bearing 61. Thereupon, the load cell 70 is pressed. The nut portion 82 is located on the opposite surface of the load cell 70 to the screw 24. The nut portion 82 is in threaded engagement with the threaded portion 80.

Thus, the pressure applied to the screw 24 is measured as the load cell 70 is pressed from both axial sides. The output signal from the load cell 70 is delivered to the controller, whereby it is determined whether or not the die set is filled with predetermined amount of resin, for example.

If pressurizing is finished after the resin is filled into the die set at a predetermined pressure, the injection unit 12 continuously performs subsequent molding cycles, thereby maintaining the nozzle-touch state. In this state, the screw rotation mechanism 26 rotates the screw 24, while the screw advancement-retraction mechanism 28 retracts the screw 24, whereupon the material is introduced again into the distal end of the cylinder 22. If a product is ejected after the die set is opened by the die clamping device 14, the die set is closed again for the next molding cycle.

In the molding cycle, the screw rotation mechanism 26 moves along the second rails 58 that are arranged parallel to the tie-bars 37. Thus, the screw rotation mechanism 26 can move smoothly, so that the screw 24 can smoothly reciprocate along axis X1.

In the present embodiment, the sliding members 69 on the respective end portions 59b of the supporting members 59 comprising the second rails 58 are axially movable relative to the tie-bars 37. Even if a deformation occurs such that the tie-bars 37 are elongated by a reactive force produced when the material is injected through the nozzle portion 54, therefore, it is absorbed as each sliding member 69 moves along axis X2 of its corresponding tie-bar 37. If the tie-bars 37 are bent, moreover, this deformation is prevented from being transmitted to the supporting members 59, so that the supporting members can maintain linearity. Thus, the deformation of the tie-bars 37 are not transmitted to the second rails 58. Consequently, the linearity of the second rails 58 and the parallelism between the rails 58 can be accurately maintained, so that the screw 24 can be caused to reciprocate smoothly during injection.

The following is a description of how the injection unit 12 is turned.

The injection unit 12 is moved rearward by activating the propulsion mechanism 30 to move the threaded portion 49 in a second direction. This movement is made in order to prevent interference between the die clamping device 14 and the injection unit 12 being turned. Then, the base 32 and frame 34 are disengaged from each other by loosening the screw 48. Since the frame 34 is mounted on the base 32, it is allowed to turn around the support pin 46 if it is disengaged from the base 32.

Figure 4:
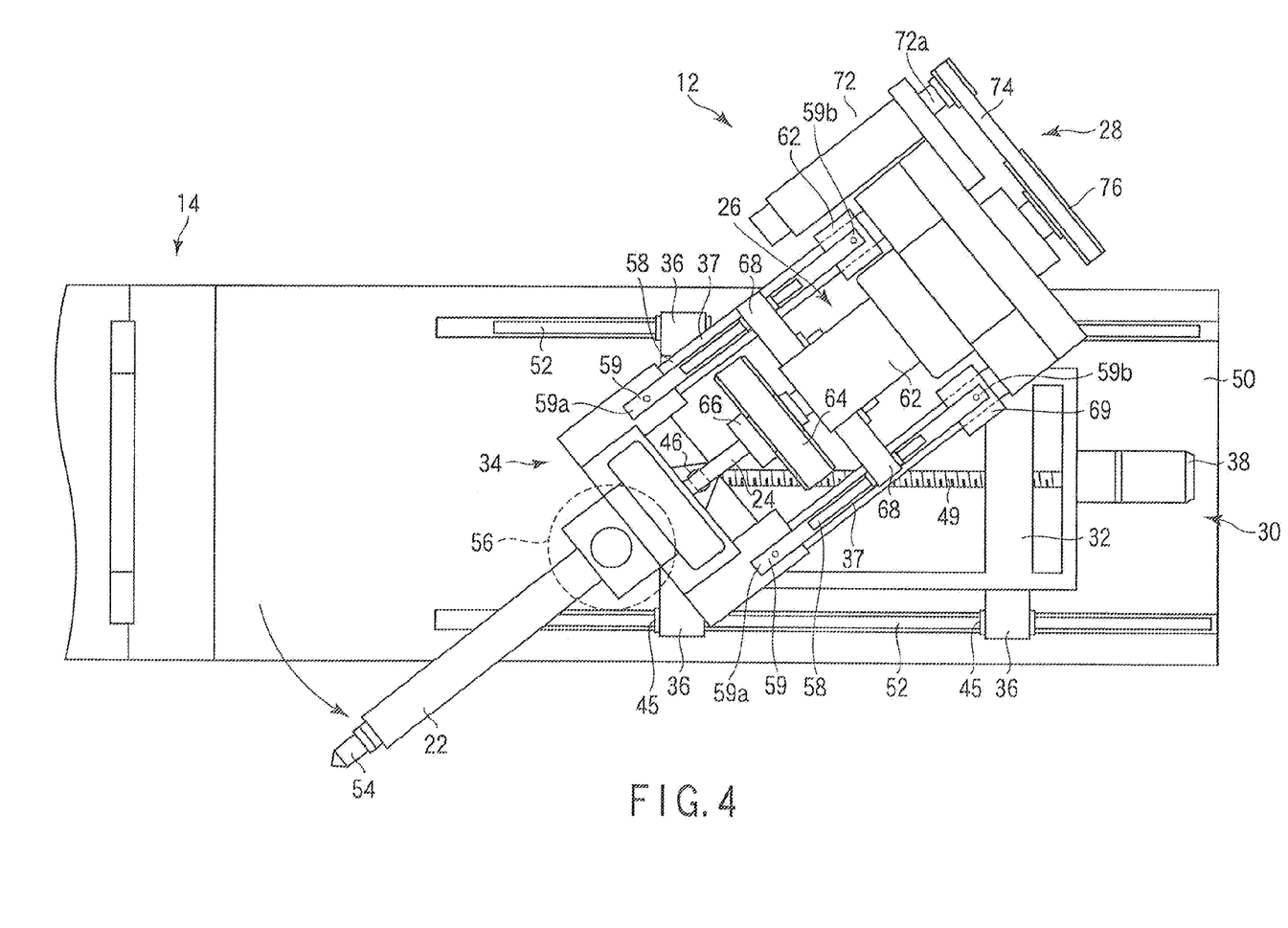
FIG. 4 is a plan view showing a state after an injection unit of the injection molding machine of FIG. 1 is turned.

FIG. 4 shows a state after the frame 34 of the injection unit 12 is turned relative to the base 32 of the mainframe 20. The injection unit 12 of the present embodiment can be turned around the support pin 46 along a horizontal plane P (FIG. 1) between the base 32 and frame 34. This turning operation is performed in, for example, cleaning or replacing the cylinder 22 and/or screw 24. The rear leg 43 can be slid along the horizontal plane P above the base 32 as the injection unit 12 is turned. Thus, the injection unit 12 can be turned easily and safely.

As described above, the injection molding machine according to the present embodiment comprises the front wall 35 of the frame 34 on which the cylinder 22 is mounted, rear wall 33 of the frame 34 on which the screw advancement-retraction mechanism 28 is mounted, and tie-bars (lateral members) 37 that connect the front and rear walls 35 and 33. The injection molding machine further comprises the supporting members 59, comprising the second rails (guide members) 58 arranged along the tie-bars 37, and screw rotation mechanism 26 movable along the second rails 58. The one end portion 59a of each supporting member 59 is secured to the frame 34 by the fixing portion including the fixing member 63 or bolt. The other end portion 59b of each supporting member 59 is supported on its corresponding tie-bar 37 for movement parallel to the screw 24 by the sliding member 69 for use as a movable portion.

Even if the tie-bars 37 are deformed by the reactive force produced during injection, therefore, the linearity of the second rails (guide members) 58 can be maintained. Thus, the screw rotation mechanism 26 can steadily move along the second rails 58, so that the screw 24 can steadily move along the second rails 58. The fixing portion may be secured to the frame 34 by some other fixing means than a bolt. Further, each sliding member 69 may be provided on the one end portion 59a of its corresponding supporting member 59 with the other end portion 59b secured to the rear wall 33 by fixing means. Furthermore, the guide and supporting members may be formed integrally.

The present invention is applicable to an injection molding machine in which a screw rotation mechanism is provided on a frame for advance and retraction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An injection molding machine comprising:
a cylinder;
a screw inserted into the cylinder;
a screw rotation mechanism configured to rotate the screw and comprising an electric motor and a transmission unit which transmits rotation of the motor to the screw;
a screw advancement-retraction mechanism which moves the screw along an axis of the screw;
a frame supporting the cylinder and comprising a front wall fitted with the cylinder, a rear wall fitted with the screw advancement-retraction mechanism, and a pair of lateral members, left and right, located beside the screw rotation mechanism and connecting the front wall and the rear wall;
a pair of supporting members arranged individually along the lateral members of the frame and each comprising a guide member which guides the screw rotation mechanism in moving along an axis of the screw;
a fixing portion which fixes one longitudinal end portion of each of the supporting members to the frame; and
a movable portion which supports the other end portion of the supporting member for movement relative to each of the lateral members along an axis of the lateral member.

2. An injection molding machine according to claim 1, wherein each of the lateral members is a tie-bar of a cylindrical shape, and the movable portion is fitted on the tie-bar for movement along the axis of the tie-bar.

3. An injection molding machine according to claim 1, wherein the fixing portion comprises a fixing member formed of a bolt configured to secure the one end portion of the supporting member to the frame.

4. An injection molding machine according to claim 2, wherein the movable portion comprises a sliding member with a bush movable along the axis of the tie-bar.

5. An injection molding machine according to claim 2, wherein each of the supporting members is located above and parallel to the tie-bar.

* * * * *